(12) United States Patent
Sun

(10) Patent No.: US 8,692,866 B2
(45) Date of Patent: Apr. 8, 2014

(54) SELF-ADAPTIVE ADJUSTMENT METHOD OF VIDEO CALL SERVICE AND VIDEO MOBILE TERMINAL

(75) Inventor: Wei Sun, Guangdong (CN)

(73) Assignee: ZTE Corporation, Shenzhen (CN)

( * ) Notice: Subject to any disclaimer, the term of this patent is extended or adjusted under 35 U.S.C. 154(b) by 347 days.

(21) Appl. No.: 13/143,126

(22) PCT Filed: Dec. 22, 2008

(86) PCT No.: PCT/CN2008/073628
§ 371 (c)(1),
(2), (4) Date: Jul. 1, 2011

(87) PCT Pub. No.: WO2010/060247
PCT Pub. Date: Jun. 3, 2010

(65) Prior Publication Data
US 2012/0007945 A1     Jan. 12, 2012

(30) Foreign Application Priority Data

Nov. 25, 2008   (CN) .......................... 2008 1 0179137

(51) Int. Cl.
*H04N 7/14* (2006.01)

(52) U.S. Cl.
USPC .................. 348/14.12; 348/14.01; 348/14.13; 370/235; 455/423

(58) Field of Classification Search
CPC ...... H04W 4/20; H04W 8/22; H04L 12/2439; H04L 29/08567
USPC .................... 348/14.01–14.16; 370/259–271, 370/351–357; 455/412.1–420, 426.1, 455/426.2, 550.1–560, 575.1–575.9, 455/90.1–90.3; 709/201–207, 217–248
See application file for complete search history.

(56) References Cited

U.S. PATENT DOCUMENTS

| | | | |
|---|---|---|---|
| 6,151,309 A * | 11/2000 | Busuioc et al. | 370/328 |
| 6,611,674 B1 * | 8/2003 | Jokimies et al. | 455/69 |
| 6,738,637 B1 * | 5/2004 | Marinho et al. | 455/512 |
| 7,069,014 B1 * | 6/2006 | Thenthiruperai et al. | 455/452.2 |

(Continued)

FOREIGN PATENT DOCUMENTS

| | | |
|---|---|---|
| CN | 1753556 A | 3/2006 |
| CN | 101207783 | 6/2008 |
| WO | 2006032890 A2 | 3/2006 |
| WO | 2008086509 A2 | 7/2008 |

OTHER PUBLICATIONS

Supplementary European Search Report for corresponding European Application No. EP08878365, Dec. 4, 2012.

*Primary Examiner* — Hemant Patel
(74) *Attorney, Agent, or Firm* — Christopher L. Parmelee; Walker & Jocke

(57) ABSTRACT

A self-adaptive adjustment method of video call service and a video mobile terminal are disclosed in the present invention, wherein the method includes: the video mobile terminal receiving parameter information representing the channel capacity of a cell to which the video mobile terminal belongs; and the video mobile terminal adjusting quality of a video call that is being performed or will be initiated by the video mobile terminal according to the parameter information received by the video mobile terminal. By the present invention, the video mobile terminal is enabled to accomplish utilization of the video call service to a maximum extent in a limited channel capacity of the cell, and the user experience is improved.

7 Claims, 5 Drawing Sheets

(56) References Cited

U.S. PATENT DOCUMENTS

| | | | |
|---|---|---|---|
| 7,099,681 B2* | 8/2006 | O'Neill | 455/512 |
| 7,373,178 B2* | 5/2008 | Lee | 455/563 |
| 7,664,036 B2* | 2/2010 | Bye | 370/237 |
| 7,769,389 B1* | 8/2010 | Mangal et al. | 455/452.1 |
| 8,254,441 B2* | 8/2012 | Sun | 375/240.01 |
| 2005/0083999 A1 | 4/2005 | Koo et al. | |
| 2005/0100100 A1 | 5/2005 | Unger | |
| 2005/0180338 A1* | 8/2005 | Pirila et al. | 370/252 |
| 2007/0053428 A1* | 3/2007 | Saleem et al. | 375/240 |
| 2008/0045215 A1* | 2/2008 | Chen et al. | 455/435.2 |
| 2008/0062253 A1* | 3/2008 | Jaspersohn et al. | 348/14.11 |
| 2008/0309748 A1* | 12/2008 | Franceschini et al. | 348/14.01 |
| 2008/0318527 A1* | 12/2008 | Higuchi et al. | 455/42 |
| 2010/0113037 A1* | 5/2010 | Ong et al. | 455/445 |
| 2010/0115094 A1* | 5/2010 | Hagendorf | 709/226 |
| 2012/0086767 A1* | 4/2012 | Lau et al. | 348/14.02 |
| 2012/0201255 A1* | 8/2012 | Manor et al. | 370/468 |

* cited by examiner

SELF-ADAPTIVE ADJUSTMENT METHOD OF VIDEO CALL SERVICE AND VIDEO MOBILE TERMINAL

FIELD OF THE INVENTION

The present invention relates to communication field, and in particular to a self-adaptive adjustment method of video call service and a video mobile terminal.

BACKGROUND OF THE INVENTION

With the development of the communication technology, the communication of the mobile terminals such as a cellphone has entered in the third Generation ("3G" for short), wherein the video call in the multimedia applications, as an upgrading of the voice call, has become one of the most important services and applications of the cellphone.

At present, the multimedia applications and other data services have quite high demands to the channel capacity of communication. Some users can not use the video call service or the users that are using the video call service are caused to be disconnected when the channel capacity of the cell does not satisfy the video call service of all video terminals belonging to the cell.

Therefore, how to guarantee the users to use the video call service to a maximum extent and to transform it into a common voice call without interruption when the video call service can not be used greatly influence the quality of the 3G service and the user experience, which is also a research emphasis in the initial stage of 3G.

However, effective solutions have yet not been provided to the problems that a self-adaptive adjustment can not be carried out between the video call quality and the channel capacity, thereby affecting the service quality of the whole user group, and how a reasonable transformation is made between the video call and the voice call

SUMMARY OF THE INVENTION

The object of the present invention lies in providing a self-adaptive adjustment method of video call service and a video mobile terminal so as to solve the problem that the video mobile terminal cannot perform a video call due to a limited channel capacity of the cell in the related art.

A self-adaptive adjustment method of video call service is provided according to one aspect of the present invention.

The self-adaptive adjustment method of video call service according to the present invention includes: a video mobile terminal receiving parameter information representing the channel capacity of a cell to which the video mobile terminal belongs; and the video mobile terminal adjusting quality of a video call that is being performed or will be initiated by the video mobile terminal according to the parameter information received by the video mobile terminal.

Preferably, the parameter information is percentage of a channel occupancy volume in the cell.

Preferably, a process of the video mobile terminal adjusting the quality of the video call that is being performed or will be initiated specifically comprises: the video mobile terminal comparing the parameter information with a first predetermined value and a second predetermined value, wherein the second predetermined value is greater than the first predetermined value; the video mobile terminal reducing the quality of the video call by adjusting a quality parameter of the video call that is being performed or will be initiated in a situation that the parameter information is greater than or equal to the first predetermined value and is smaller than or equal to the second predetermined value; and the video mobile terminal reducing the quality of the video call by transforming the video call that is being performed or will be initiated into a voice call, in a situation that the parameter information is greater than the second predetermined value.

Preferably, the quality parameter includes at least one of: frame rate, picture quality and image color of a video.

Preferably, the method further comprises: a base station or Mobile Exchange Center monitoring the channel capacity of the cell, and sending the parameter information to the video mobile terminal with preset periodically.

A video mobile terminal is further provided according to the other aspect of the present invention.

The video mobile terminal according to the present invention comprises a receiving module configured to receive parameter information of a channel capacity of a cell to which the video mobile terminal belongs, wherein the parameter information is percentage of a channel occupancy volume in the cell; and an adjusting module configured to adjust quality of a video call that is being performed or will be initiated by the video mobile terminal according to the parameter information received by the receiving module.

Preferably, the adjusting module specifically comprises: a comparing module configured to compare the parameter information with a first predetermined value and a second predetermined value, wherein the second predetermined value is greater than the first predetermined value; a first adjusting sub-module, configured to reduce the quality of the video call by adjusting a quality parameter of the video call that is being performed or will be initiated in a situation that the parameter information is greater than or equal to the first predetermined value and is smaller than or equal to the second predetermined value; and a second adjusting sub-module, configured to reduce the quality of the video call by transforming the video call that is being performed or will be initiated into a voice call, in a situation that the parameter information is greater than the second predetermined value.

Preferably, the quality parameter includes at least one of: frame rate, picture quality and image color of a video.

Through the above technical solutions of the present invention, the problem that a video mobile terminal cannot perform a video call due to the limited channel capacity of the cell in the related art is solved by the video mobile terminal adjusting the quality of the video call according to the parameter information of the channel capacity of the cell, which enables the video mobile terminal to accomplish utilization of the video call to a maximum extent in the limited channel capacity of the cell.

BRIEF DESCRIPTION OF THE DRAWINGS

The drawings illustrated herein provide a further understanding of the present invention and form a part of the present application. The exemplary embodiments in the present invention and the description thereof are used to explain the present invention without unduly limiting the present invention, wherein.

DETAILED DESCRIPTION OF EMBODIMENTS

Function Overview

In a cellular communication mode, a cell control terminal checks the utilization condition of channel of the whole cell in real time, and sends the condition to all users in the cell periodically. All the users in the cell, however, do not need to consider this parameter when performing a common voice call service, but should adjust a data quantity of video calls according to this parameter and in reference to a preset protocol when performing a video call service. The parameter of the video call of individual users in the cell will decrease gradually, when the channel capacity of the cell is reduced continuously, to guarantee that more users can use the service of video call in a user acceptable range. The video call of the cell user will be degraded to the voice call without interruption when the channel capacity of the cell is reduced to a certain lower threshold value. With the present invention, on one hand, it is guaranteed that the call of the user is free of interruption, and on the other hand, it is also avoided that a serious consequence of network breakdown is caused by other services occurring later.

Next, preferred embodiments of the present invention are illustrated in conjunction with the drawings. It should be understood that the preferred embodiments described herein are merely used for illustrating and explaining the present invention, without limiting the present invention.

Method Embodiments

A self-adaptive adjustment method of video call service is provided according to one aspect of the present invention.

Figure 1:
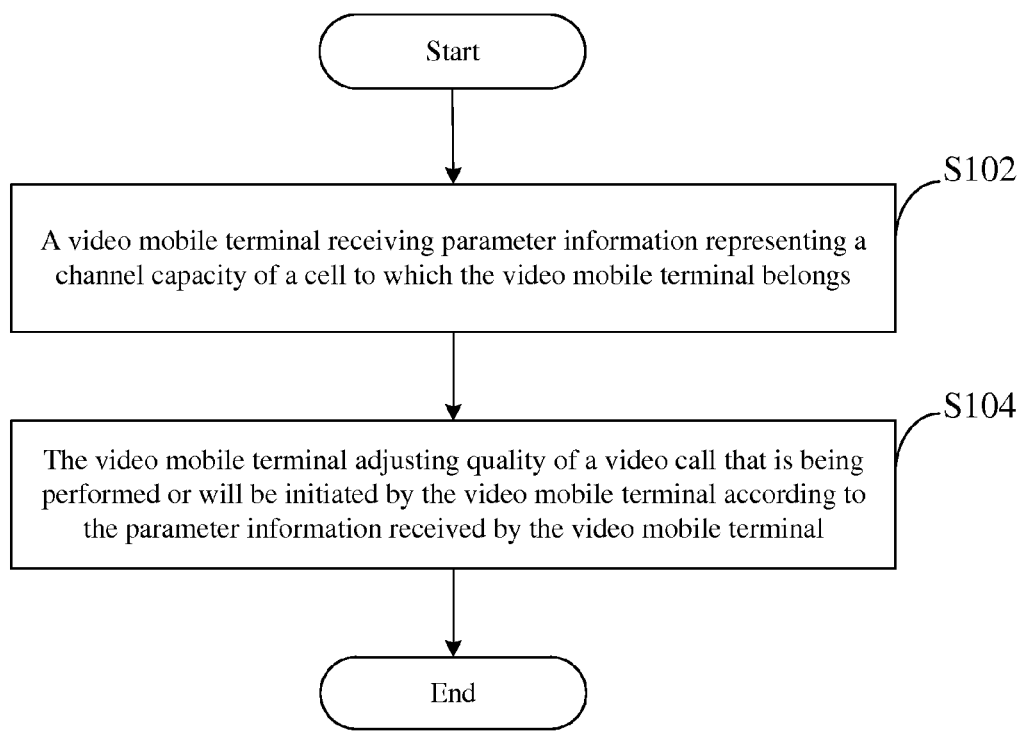
FIG. 1 is a flowchart of a self-adaptive adjustment method of video call service according to a method embodiment in the present invention.

FIG. 1 is a flowchart of a self-adaptive adjustment method of video call service according to an embodiment in the present invention. It should be indicated that the steps described in the following methods can be executed in a computer system such as a group of compute executable commands; moreover, though a logic order is shown in FIG. 1, in some situations, the steps shown or described may be executed in an order different from that herein. As shown in FIG. 1, the method includes the following processes:

step S102, a video mobile terminal receives parameter information representing the channel capacity of a cell to which the video mobile terminal belongs; and step S104, the video mobile terminal adjusts quality of a video call that is being performed or will be initiated by the video mobile terminal according to the parameter information received by the video mobile terminal.

By the above embodiment, the video mobile terminal adjusts the quality of the video call thereof according to the parameter information of the channel capacity received, which enables the video mobile terminal to accomplish utilization of the video call to a maximum extent in the limited channel capacity of the cell.

Next, details in the above processes will be specified.

(1) Step S102

According to the present invention, the following parameters should be defined first:

① Boolean m_Voice_can, indicating whether a voice call can be performed, wherein True means YES, and False means NO;

② Boolean m_Video_can, indicating whether a video call can be performed, wherein True means YES, and False means NO;

③ Unit 16 percent_of_channel, indicating the condition of current channel utilization, ranging from 0% to 100%;

④ Packet m_Voice_data, which is a voice call data packet; and

⑤ Packet m_Video_data, which is a video call data packet.

When m_Voice_can is True, and m_Video_can is False, it indicates that only a voice call can be performed, herein there is data in m_Voice_data, while there is no data in m_Video_data.

When m_Video_can is True, m_Voice_can is accordingly True, which indicates that a video call is being performed, and herein there is data in both m_Voice_data and m_Video_data.

The utilization condition of the cell channels is monitored in real time at the cell control terminal (base station or mobile switching center), and the parameter information representing this condition is sent periodically to each user in the cell, wherein the parameter information includes percent_of_channel parameter (i.e. percentage of channel occupancy volume of the cell).

(2) Step S104

At a user terminal, the user does not need to consider the percent_of_channel parameter when dialing a voice call, but should adjust the size of data packet of its own video call to make a call according to the real-time received channel condition of a cell to which the user terminal belongs, when dialing the video call. The video call data packet size is adjusted on the basis of the percent_of_channel parameter sent periodically from the cell control terminal. User equipment, according to this numerical value, reaches the channel capacity currently allowed by adjusting parameters such as encoding format, picture quality and image color of a video of the video call.

The cell user can use a normal parameters for performing the video call when the channel capacity of the cell is sufficient. The cell control terminal will send information such as percent_of_channel to the cell user when the channel capacity reaches a predetermined quantity, to make parameters of the video call performed thereby to be reduced somewhat. With the continuous reduction of the channel capacity of the cell, the parameters of the video call of the user performing the video call in the cell also will be reduced continuously. These parameters can be frame number, picture quality, image color, etc. of a video. When the channel capacity of the cell reaches a certain lower threshold value (a second predetermined value), all users in the cell can only carry out the common voice call service. On the contrary, the parameters of the video call also will rise continuously when the channel capacity of the cell starts to rise. When the channel capacity of the cell reaches a certain upper threshold value (a first predetermined value), the users in the cell can use again the normal parameters to carry out the video call service.

A degrading process from the video call service to the voice call service and a process of upgrading from the voice call service to the video call service are carried out in a progressive way, for instance, a frame rate of the video call generally is 15 frames, and when the channel capacity rises continuously, firstly the frame rate of the video call can be gradually reduced in a user acceptable range, possibly from 15 frames to 10 frames, 7 frames, and even 5 frames. The parameters such as picture quality and color degree of the image can be considered to be simultaneously or further gradually reduced while the frame rate is reduced. A final object is to enable a data rate of a video call of a current user to be adapted to requirements of the current network channel capacity. The video call service further needs to be transformed into the voice service if necessary. The scene described above is a process of degrading from the video call service to the voice call service. Similarly, the process of upgrading from the voice call service to the video call service is also carried out in a progressive way. Unnecessary details will not be given herein.

The quality of the video call can be adjusted correspondingly after the network channel capacity changes. The adjustment is controlled on the basis of a base station capacity (percentage of Bn), referring to Table. 1. It is assumed that the network does not limit the video call when a network channel occupancy volume is lower than 50%; the frame rate is reduced once when the occupancy volume is more than 50%, the frame rate is reduced again when the occupancy volume is more than 70%; and the network stops forwarding an image data when the occupancy volume is more than 90%, and all users in the network can only perform the voice call.

TABLE 1

| Channel Capacity (Percentage of Bn) | Whether to Limit or Not |
| --- | --- |
| <50% | Not Limit |
| 50%-70% | Start to Reduce the Frame Rate |
| 70%-90% | Reduce the Frame Rate further, and the Picture Quality, Image Color as Well |
| >90% | Suspend Sending of Image Data |

The advantage of using the percentage of the channel capacity of the base station as parameter for adjustment instead of directly using a specific numerical value is to facilitate subsequent updating and upgrading of the system, and the adjustment still may be performed according to this proportion without a need of changing the numerical value when the cell capacity is improved in future.

By the above embodiment, the video call is enabled to perform a self-adaptive adjustment according to a current network capacity so as to improve equity degree of the network utilization and friendly degree of the user, and satisfy the communication requirements of the users to a maximum extent.

Figure 2:
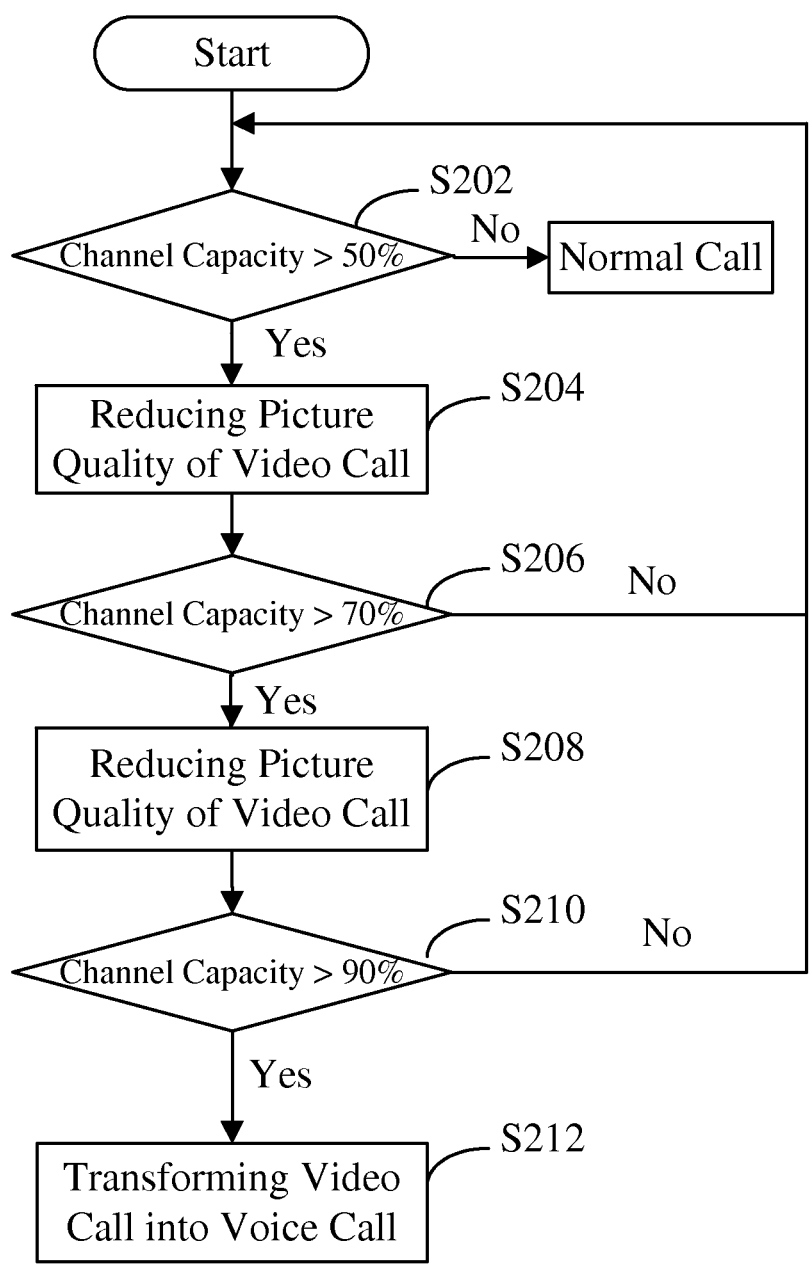
FIG. 2 is a flowchart of one processing embodiment of a self-adaptive adjustment method of video call service according to a method embodiment in the present invention.

FIG. 2 is a flowchart of one processing embodiment of a self-adaptive adjustment method of video call service according to a method embodiment in the present invention. As shown in FIG. 2, the flow includes the following processes:

step S202, a video call terminal receives a channel occupancy volume parameter of a current cell, and judges whether a channel occupancy volume in the cell is greater than 50%, wherein if not, it performs a normal video call (i.e. Boolean m_Video_can is True); and if yes, it carries out step S204;

step S204, the video call terminal reduces parameter quality of the video call that is performed, for instance, possibly reduces a frame rate of the video call, and carries out step S206;

step S206, the video call terminal judges whether the channel occupancy volume in the cell is greater than 70%, wherein if not, it carries out step S202; and if yes, it carries out step S208;

step S208, the video call terminal reduces again the parameter quality of the video call that is performed, for instance, possibly reduces as well the picture quality and image color of the video call on the basis of reducing the frame rate of the video call, and carries out step S210;

step S210, the video call terminal judges whether the channel occupancy volume in the cell is greater than 90%, wherein if not, it carries out step S202 is carried out; and if yes, it carries out step S212; and step S212, it forbids the video call, and transforms the video call into a voice call (i.e. m_Voice_can is True and m_Video_can is False).

The flow above shows a process of reducing gradually the video call quality when the channel occupancy volume deteriorates continuously. The network pressure is eased by reducing continuously the quality of the video call, when the channel capacity of the cell is reduced gradually, until the video call is reduced to the voice call, so as to avoid occurrence of call-drop to a maximum extent and improve friendly degree of user utilization.

Figure 3:
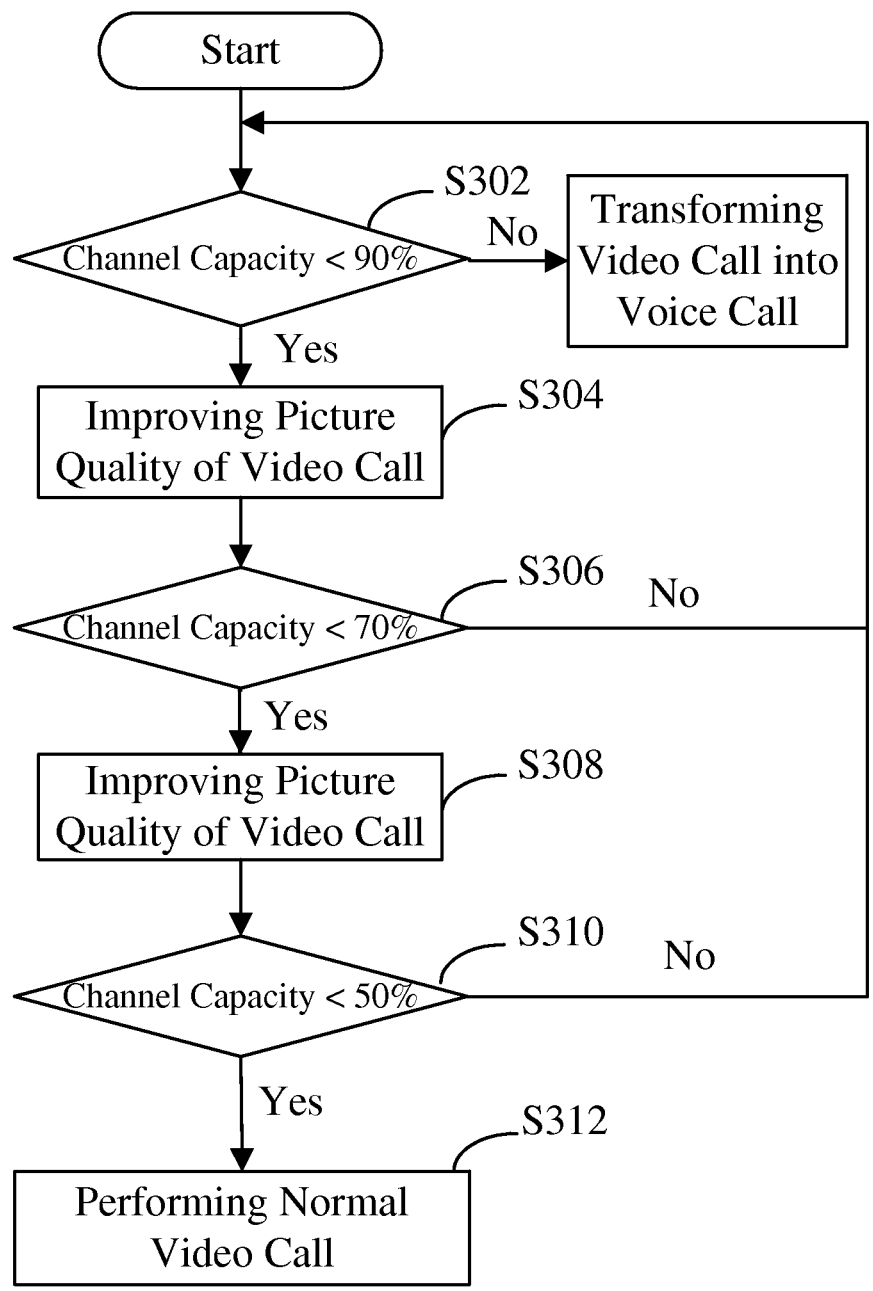
FIG. 3 is a flowchart of another processing embodiment of a self-adaptive adjustment method of video call service according to a method embodiment in the present invention.

FIG. 3 is a flowchart of another processing embodiment of a self-adaptive adjustment method of video call service according to a method embodiment in the present invention. As shown in FIG. 3, the flow includes the following processes:

step S302, a video call terminal receives a channel occupancy volume parameter of a current cell to judge whether a channel occupancy volume in the cell is less than 90%, wherein if not, it forbids a video call and transforms the video call into a voice call (i.e. m_Voice_can is True and m_Video_can is False); and if yes, it carries out step S304;

step S304, the video call terminal improves parameter quality of a video call that is performed, for instance, possibly improves partially a frame rate of the video call, and picture quality and image color of the video call, and carries out step S304;

step S306, the video call terminal judges whether the channel occupancy volume in the cell is less than 70%, wherein if not, it carries out step S302; and if yes, it carries out step S308;

step S308, the video call terminal improves again the parameter quality of the video call that is performed, for instance, possibly further improves parameters such as the frame rate, the picture quality and the image color of the video call on the basis of the improving in step S304, and carries out step S310;

step S310, the video call terminal judges whether the channel occupancy volume in the cell is less than 50%, wherein if not, it carries out step S302; and if yes, it carries out step S312; and step S312, a normal video call service is carried out (i.e. Boolean m_Video_can is True).

The above flow shows a process of improving gradually voice call quality when the channel occupancy volume is improved continuously.

Figure 4:
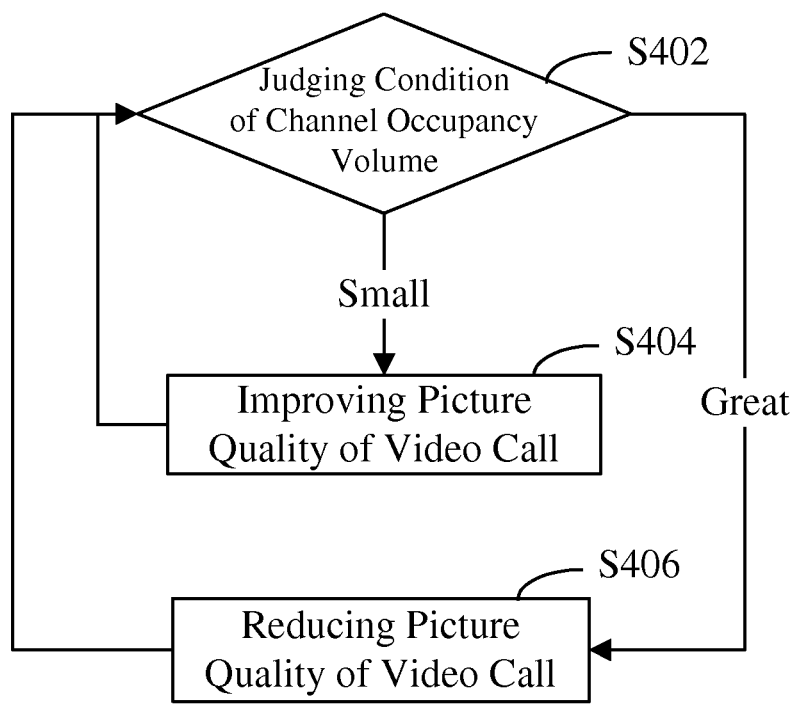
FIG. 4 is a flowchart of another processing embodiment of a self-adaptive adjustment method of video call service according to a method embodiment in the present invention.

FIG. 4 is a flowchart of another processing embodiment of a self-adaptive adjustment method of video call service according to a method embodiment in the present invention. As shown in FIG. 4, the flow includes the following processes:

step S402, a video call terminal judges current channel occupancy volume condition, and carries out step S404 if the channel occupancy volume is quite small, otherwise, carries out step S406;

step S404, the quality of a video call is improved; and step S406, the quality of the video call is reduced.

Particularly, the processing flow shown in FIG. 3 can be referred to for the process in step S404, and the processing flow shown in FIG. 2 can be referred to for the process in step S406.

After step S404 and step S406 are carried out, Step S402 can be carried out again after a predetermined time of period. The object of self-adaptive adjustment of the video call is achieved through this flow.

It should be noted that the parameter information of the channel capacity is not limited to the percentage of the occupancy volume, though the percentage (percent_of_channel) of the channel occupancy volume in the cell is described hereinbefore as parameter information of the channel capacity. The parameter information further may be other parameters for representing the channel capacity, such as remaining channel capacity value and channel capacity occupancy value.

Moreover, the parameter values shown in Table 1 are merely an example, while the parameter values can be configured according to different requirements in practical applications but not limited to the numerical values shown in Table 1.

Apparatus Embodiment

A video mobile terminal is further provided according to an embodiment in the present invention. The video mobile terminal can be configured to accomplish the self-adaptive adjustment method of video call service provided in the above method embodiments.

Figure 5:
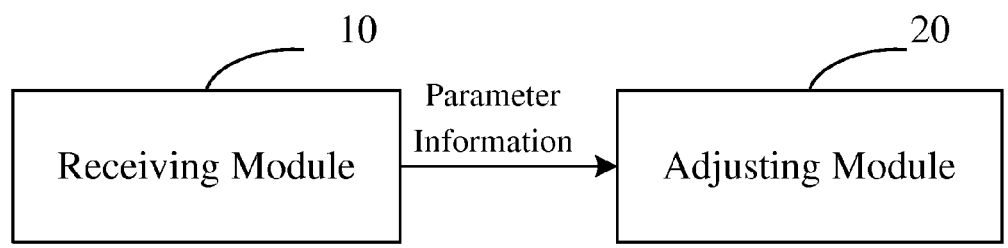
FIG. 5 is a block diagram of a video mobile terminal according to an apparatus embodiment in the present invention.
Figure 6:
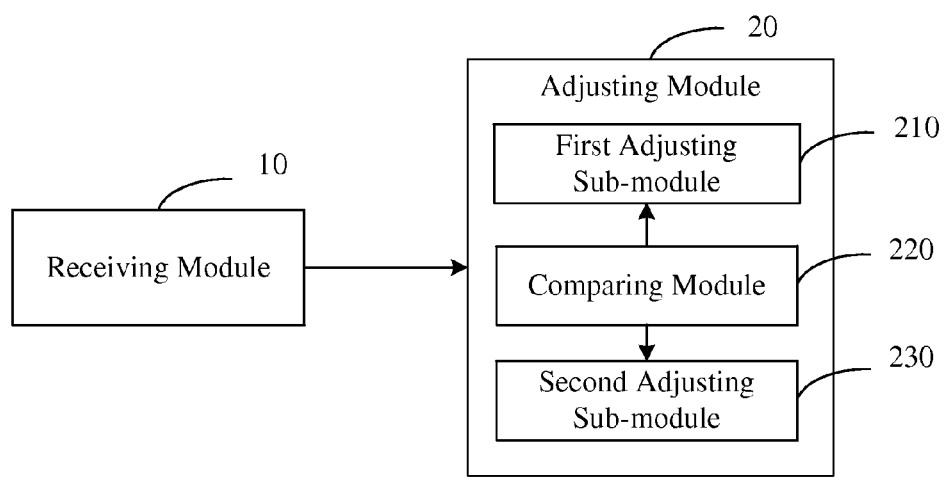
FIG. 6 is a block diagram of a preferred structure of a video mobile terminal according to an apparatus embodiment in the present invention.

FIG. 5 is a block diagram of a video mobile terminal according to an embodiment in the present invention; and FIG. 6 is a block diagram of a preferred structure of a video mobile terminal according to an embodiment in the present invention.

As shown in FIG. 5, the video mobile terminal according to an embodiment in the present invention comprises a receiving module 10 and an adjusting module 20, wherein particularly, the receiving module 10 is configured to receive parameter information representing a channel capacity of a cell to which the video mobile terminal belongs, wherein the parameter information is percentage of a channel occupancy volume in the cell; and the adjusting model 20 is connected to the receiving module 10, and configured to adjust quality of a video call that is being performed or will be initiated by the video mobile terminal according to the parameter information received.

As shown in FIG. 6, the adjusting module 20 according to the embodiment in the present invention specifically comprises:

a comparing module 210 configured to compare the parameter information with a first predetermined value and a second predetermined value, wherein the second predetermined value is greater than the first predetermined value;

a first adjusting sub-module 220 connected to the comparing module 210, and configured to adjust a quality parameter of the video call that is being performed or will be initiated so as to reduce the quality of the video call in a situation that the parameter information is greater than or equal to the first predetermined value and is smaller than or equal to the second predetermined value; and a second adjusting sub-module 230 connected to the comparing module 210, and configured to transform into a voice call the video call that is being performed or will be initiated so as to reduce the quality of the video call in a situation that the parameter information is greater than the second predetermined value.

In the above, the above quality parameter includes at least one of frame rate, picture quality and image color of a video.

In a particular implementing process, the video mobile terminal provided according to the embodiment in the present invention can likewise accomplish the processes shown in FIG. 1, FIG. 2, FIG. 3 and FIG. 4, so that the video mobile terminal is enabled to accomplish utilization of the video call service to a maximum extent in a limited channel capacity of the cell. The specific processing processes have been described in detail hereinbefore in conjunction with the figures, and will not be repeated again herein.

To sum up, through the above technical solutions in the present invention, the problem that the video call service that is being carried out is broken off or the video call service cannot be carried out due to a limited channel capacity of a cell in the related art is solved by the video mobile terminal adjusting the quality of the video call according to the parameter information of the channel capacity of the cell, which enables the video mobile terminal to accomplish utilization of the video call to a maximum extent in the limited channel capacity of the cell and improves the user experience.

Apparently, the person skilled in the art should know that each module or each step in the present invention can be realized by the general calculating apparatus; and they can be collected in a single calculating apparatus or distributed on a network formed by a plurality of calculating apparatus. Optionally, they can be realized by the program codes executable by the calculating apparatus, therefore they can be stored in the storing apparatus to be executed by the calculating apparatus, or they can be fabricated into integrated circuit modules, respectively, or a plurality of steps therein are fabricated into individual integrated circuit module for the accomplishment. Thus, the present invention is not limited to the combination of any particular hardware and software.

The above mentioned is merely the preferred embodiments of the present invention but not to limit the present invention. Various alterations and changes to the present invention are apparent to the person skilled in the art. Any modifications, equivalent substitutions, improvements etc. within the spirit and principle of the present invention should be covered by the protection scope of the present invention.

What is claimed is:

1. A self-adaptive adjustment method of video call service, comprising:

a video mobile terminal receiving parameter information representing the channel capacity of a cell to which the video mobile terminal belongs, wherein the parameter information is percentage of a channel occupancy volume of the cell; and the video mobile terminal adjusting quality of a video call that is being performed or will be initiated by the video mobile terminal according to the parameter information received by the video mobile terminal;

wherein the step of adjusting quality of the video call comprises adjusting a quality parameter of the video call or transforming the video call into a voice call.

2. The method according to claim 1, wherein a process of the video mobile terminal adjusting the quality of the video call that is being performed or will be initiated comprises:

the video mobile terminal comparing the parameter information with a first predetermined value and a second predetermined value, wherein the second predetermined value is greater than the first predetermined value;

the video mobile terminal reducing the quality of the video call by adjusting a quality parameter of the video call that is being performed or will be initiated in a situation that the parameter information is greater than or equal to the first predetermined value and is smaller than or equal to the second predetermined value; and the video mobile terminal reducing the quality of the video call by transforming the video call that is being performed or will be initiated into a voice call, in a situation that the parameter information is greater than the second predetermined value.

3. The method according to claim 2, wherein the quality parameter comprises at least one of frame rate, picture quality and image color of a video.

4. The method according to claim 1, wherein further comprising:

a base station or Mobile Switching Center monitoring a channel capacity of the cell, and sending the parameter information to the video mobile terminal with preset periodicity.

5. A video mobile terminal, comprising:

a receiving module configured to receive parameter information of a channel capacity of a cell to which the video mobile terminal belongs, wherein the parameter information is percentage of a channel occupancy volume in the cell; and an adjusting module configured to adjust quality of a video call that is being performed or will be initiated by the video mobile terminal according to the parameter information received by the receiving module; wherein adjusting quality of the video call comprises adjusting a quality parameter of the video call or transforming the video call into a voice call.

6. The video mobile terminal according to claim 5, wherein the adjusting module comprises:

a comparing module, configured to compare the parameter information with a first predetermined value and a second predetermined value, wherein the second predetermined value is greater than the first predetermined value;

a first adjusting sub-module, configured to reduce the quality of the video call by adjust a quality parameter of the video call that is being performed or will be initiated in a situation that the parameter information is greater than or equal to the first predetermined value and is smaller than or equal to the second predetermined value; and a second adjusting sub-module, configured to reduce the quality of the video call by transforming the video call that is being performed or will be initiated into a voice call, in a situation that the parameter information is greater than the second predetermined value.

7. The video mobile terminal according to claim 6, wherein the quality parameter includes at least one of frame rate, picture quality and image color of a video.

* * * * *